(12) United States Patent
Xu et al.

(10) Patent No.: US 11,180,146 B2
(45) Date of Patent: Nov. 23, 2021

(54) BRAKE CONTROL TECHNIQUE TO STOP A VEHICLE FOR ASSISTING AUTOMATIC TRAILER HITCHING

(71) Applicant: Ford Global Technologies, LLC, Dearborn, MI (US)

(72) Inventors: Li Xu, Northville, MI (US); Eric Hongtei Tseng, Canton, MI (US); Luke Niewiadomski, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 101 days.

(21) Appl. No.: 16/411,186

(22) Filed: May 14, 2019

(65) Prior Publication Data

US 2020/0361466 A1 Nov. 19, 2020

(51) Int. Cl.
*B60W 30/18* (2012.01)
*B60T 8/172* (2006.01)
(Continued)

(52) U.S. Cl.
CPC ......... *B60W 30/18009* (2013.01); *B60T 7/12* (2013.01); *B60T 8/171* (2013.01); *B60T 8/172* (2013.01); *B60T 8/18* (2013.01); *B60T 8/321* (2013.01); *B60T 8/34* (2013.01); *B60T 8/58* (2013.01); *B60W 10/04* (2013.01); *B60W 10/184* (2013.01); *B60W 10/20* (2013.01); *B60W 30/18109* (2013.01); *B62D 15/025* (2013.01); *B60T 2240/00* (2013.01); *B60T 2250/02* (2013.01); *B60T 2250/04* (2013.01); *B60T 2260/09* (2013.01); *B60W 2400/00* (2013.01); *B60W 2420/42* (2013.01); *B60W 2510/182* (2013.01); *B60W 2520/12* (2013.01);
(Continued)

(58) Field of Classification Search
None
See application file for complete search history.

(56) References Cited

U.S. PATENT DOCUMENTS 5,948,035 A * 9/1999 Tomita ................ B60T 8/172
                                                      180/197
7,475,953 B2    1/2009 Osborn et al.
(Continued)

FOREIGN PATENT DOCUMENTS

CN     106627590 A    5/2017
DE       4108948 A1   9/1992
DE      19622682 A1  12/1996

*Primary Examiner* — Tamara L Weber
(74) *Attorney, Agent, or Firm* — Raymond Coppiellie; Price Heneveld LLP

(57) ABSTRACT

A vehicle control system configured to control a braking operation of a hitch ball to a coupler on a trailer. The system may comprise a vehicle brake control system, a maneuvering system, an image sensor configured to capture an image data, and a velocity sensor. The system may also comprise a vehicle mass sensor configured to detect a vehicle mass and a controller. The controller may be configured to control the maneuvering system of the vehicle along a vehicle path. The controller may also identify a coupler distance based on the image data depicting a coupler of the trailer. The controller may also calculate a stopping distance for the braking operation based on a plurality of braking parameters, wherein the braking parameters comprise the velocity, the brake pressure, and the vehicle mass.

20 Claims, 10 Drawing Sheets

(51) Int. Cl.
    *B60T 8/171*     (2006.01)
    *B60T 7/12*      (2006.01)
    *B60T 8/18*      (2006.01)
    *B60T 8/32*      (2006.01)
    *B60T 8/34*      (2006.01)
    *B60T 8/58*      (2006.01)
    *B62D 15/02*     (2006.01)
    *B60W 10/184*    (2012.01)
    *B60W 10/20*     (2006.01)
    *B60W 10/04*     (2006.01)
    *G05D 1/00*      (2006.01)

(52) U.S. Cl.
    CPC ... *B60W 2520/125* (2013.01); *B60W 2530/10* (2013.01); *B60W 2530/20* (2013.01); *B60W 2710/06* (2013.01); *B60W 2710/182* (2013.01); *B60W 2710/20* (2013.01); *B60Y 2300/18008* (2013.01); *B60Y 2300/18108* (2013.01); *B60Y 2300/28* (2013.01); *G05D 1/0011* (2013.01)

(56) References Cited

U.S. PATENT DOCUMENTS

| | | |
|---|---|---|
| 9,096,199 B2 | 8/2015 | Yopp |
| 9,102,271 B2 | 8/2015 | Trombley et al. |
| 9,415,692 B2 | 8/2016 | Kato et al. |
| 10,266,023 B2 | 4/2019 | Mattern et al. |
| 2013/0124060 A1 | 5/2013 | Svensson et al. |
| 2013/0151101 A1 | 6/2013 | Szymanski et al. |
| 2013/0173132 A1* | 7/2013 | Yuasa ............... B60T 8/17558 701/70 |
| 2014/0012465 A1* | 1/2014 | Shank ............... B62D 15/0285 701/36 |
| 2015/0203081 A1* | 7/2015 | Paulson ................. B60T 8/58 701/70 |
| 2016/0052548 A1* | 2/2016 | Singh ..................... B60D 1/36 701/37 |
| 2019/0337399 A1* | 11/2019 | Schonhuber ........... G01C 21/34 |
| 2019/0339704 A1* | 11/2019 | Yu ............................. G06T 7/174 |
| 2019/0340787 A1* | 11/2019 | Ramirez Llanos .. G05D 1/0251 |
| 2020/0039517 A1* | 2/2020 | Berkemeier ......... G05D 1/0231 |

\* cited by examiner

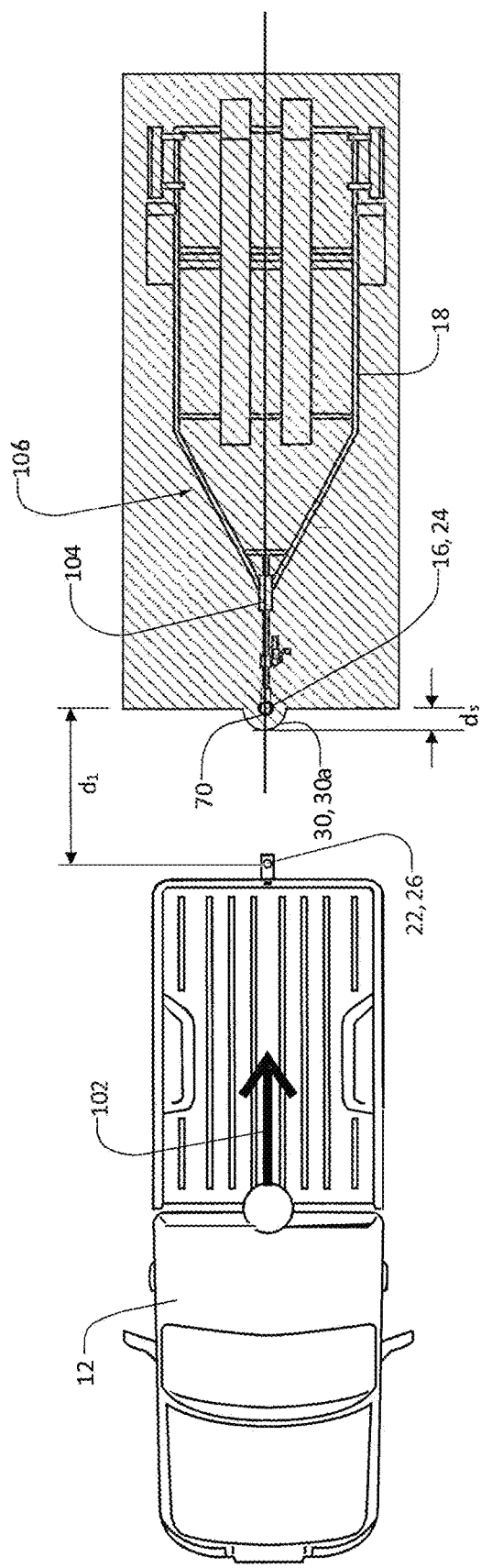
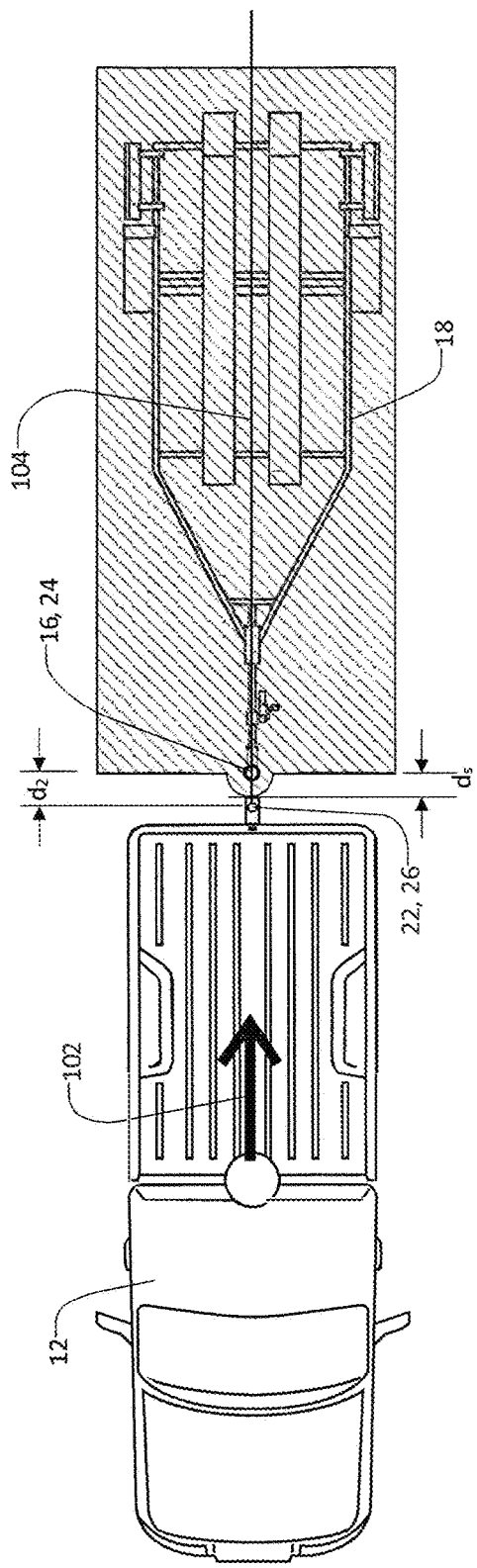
FIG. 5A
FIG. 5B

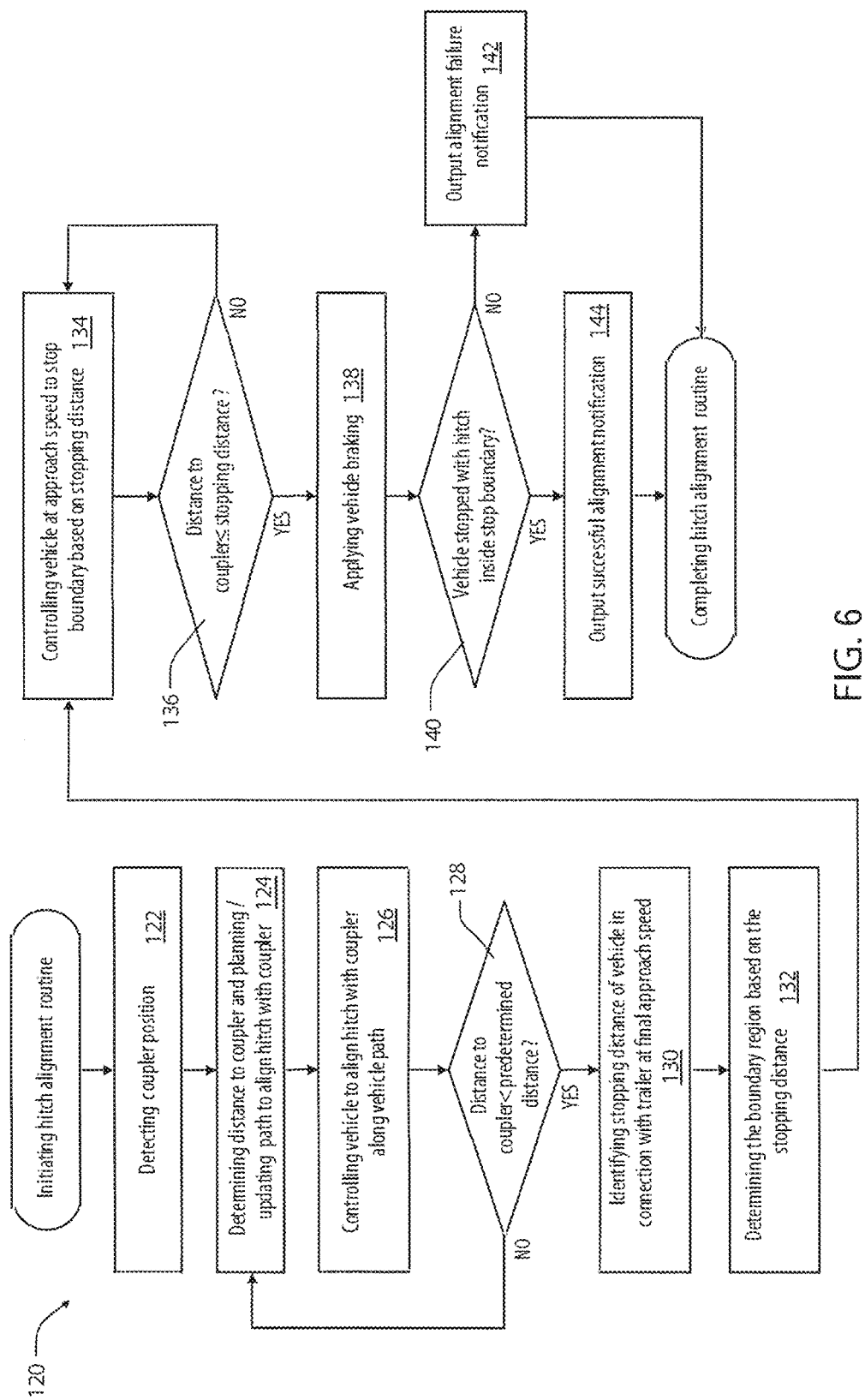

BRAKE CONTROL TECHNIQUE TO STOP A VEHICLE FOR ASSISTING AUTOMATIC TRAILER HITCHING

FIELD OF THE DISCLOSURE

The present disclosure generally relates to a system for assisting in a vehicle-trailer hitching operation. In particular, the present disclosure relates to a system for guiding a vehicle to connect a trailer coupler.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. The disclosure may provide for various features and operating methods that may improve a vehicle hitching process.

SUMMARY OF THE INVENTION

According to one aspect of the present disclosure, a vehicle control system is configured to control a braking operation of a hitch ball to a coupler on a trailer. The system may comprise a vehicle brake control system, a maneuvering system, and an image sensor configured to capture an image data. The system may also comprise a velocity sensor configured to detect velocity of the vehicle and a brake pressure sensor configured to detect a brake pressure of a braking system. The system may also comprise a vehicle mass sensor configured to detect a vehicle mass and a controller. The controller may be configured to control the maneuvering system of the vehicle along a vehicle path. The controller may also identify a coupler distance based on the image data depicting a coupler of the trailer. The controller may also calculate a stopping distance for the braking operation based on a plurality of braking parameters, wherein the braking parameters comprises the velocity, the brake pressure, and the vehicle mass. The controller may also be configured to control the vehicle brake control system via the braking operation. The controller may also be configured to stop the vehicle via the braking operation within the vehicle brake control system.

Implementations of the first aspect of the disclosure can include any one or a combination of the following features:
  in response to the coupler distance less than or equal to the stopping distance, controlling a braking system to execute a braking operation;
  wherein the braking operation comprises applying a linear increase in brake pressure;
  wherein the braking operation comprises updating a stopping distance based on a change in at least one of the braking parameters maintaining the brake pressure increasing at a linear rate throughout the braking operation;
  wherein calculating the stopping distance further comprises calculating a brake pressure of the braking system, a brake pressure build rate of the braking system, or a minimum standstill brake pressure of the braking system of the vehicle; and
  wherein the controller effectuates the smooth deceleration profile by gradually increasing the brake pressure at a linear rate.

According to another aspect of the present disclosure, a method for controlling a braking operation of a vehicle may comprise controlling a maneuver of the vehicle along a vehicle path, monitoring a coupler distance from a hitch ball to a coupler, and calculating a stopping distance to stop the vehicle with a brake pressure increasing at a linear rate based on the coupler distance from the hitch ball to the coupler. The method may also comprise detecting a velocity change of the vehicle and consist of updating the stopping distance. The method may also comprise stopping the vehicle with a smooth deceleration profile via the braking operation, wherein the smooth deceleration profile comprises monitoring and updating the calculation of the stopping distance in response to detecting the velocity change to maintain the linear rate.

Implementations of the first aspect of the disclosure can include any one or a combination of the following features:
  in response to monitoring the coupler distance and the coupler distance is less than or equal to the stopping distance, executing the braking operation;
  wherein calculating the stopping distance is based on calculating at least one of the brake pressure of the braking system, a brake pressure build rate of the braking system, or a minimum standstill brake pressure of the braking system of the vehicle;
  wherein the calculation of the stopping distance is based on a mass of the vehicle and a tire radius of the vehicle;
  wherein change in velocity results from change in at least one of a road grade and a drive torque; and
  wherein the maneuver of the vehicle comprises controlling a powertrain control system and a power assist steering system.

According to another aspect of the present disclosure, a method for controlling a braking operation of a vehicle may comprise controlling a maneuver of the vehicle along a vehicle path. The method may also comprise monitoring a plurality of braking parameters for changes during the maneuver wherein the braking parameters comprise at least one of a velocity, a brake pressure, and a vehicle mass. The method may also comprise calculating a stopping distance for the braking operation based on the plurality of braking parameters to maintain a linear rate based on the coupler distance from the hitch ball to the coupler. The method may also comprise updating the calculation of the stopping distance in response to detecting a change in at least one of the braking parameters and stopping the vehicle via the braking operation.

Implementations of the first aspect of the disclosure can include any one or a combination of the following features:
  wherein the maneuver of the vehicle comprises monitoring a powertrain control system, a power assist steering system, and a positioning system;
  wherein the braking operation maintains a brake pressure of the braking system such that the brake pressure is greater than or equal to the minimum standstill brake pressure in response to the vehicle at a standstill;
  wherein calculating the stopping distance further comprises calculating at least one of a brake pressure build rate of the braking system or a minimum standstill brake pressure of the braking system of the vehicle;
  wherein calculating the stopping distance further comprises accessing a mass of the vehicle and a tire radius of the vehicle to calculate the minimum standstill brake pressure;
  wherein the change in the velocity comprises a change in at least one of a road grade and a drive torque;

wherein the braking operation comprises applying a linear increase in brake pressure; and wherein the controller effectuates the smooth deceleration profile by gradually increasing the brake pressure at a linear rate.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5A is a plan view of a vehicle approaching a trailer during an alignment procedure;

FIG. 5B is a plan view of a vehicle approaching a trailer during an alignment procedure;

FIG. 6 is a flowchart demonstrating a method for controlling an alignment between a vehicle hitch and a coupler of a trailer in accordance with the disclosure;

DETAILED DESCRIPTION OF THE PREFERRED IMPLEMENTATIONS

Figure 1:
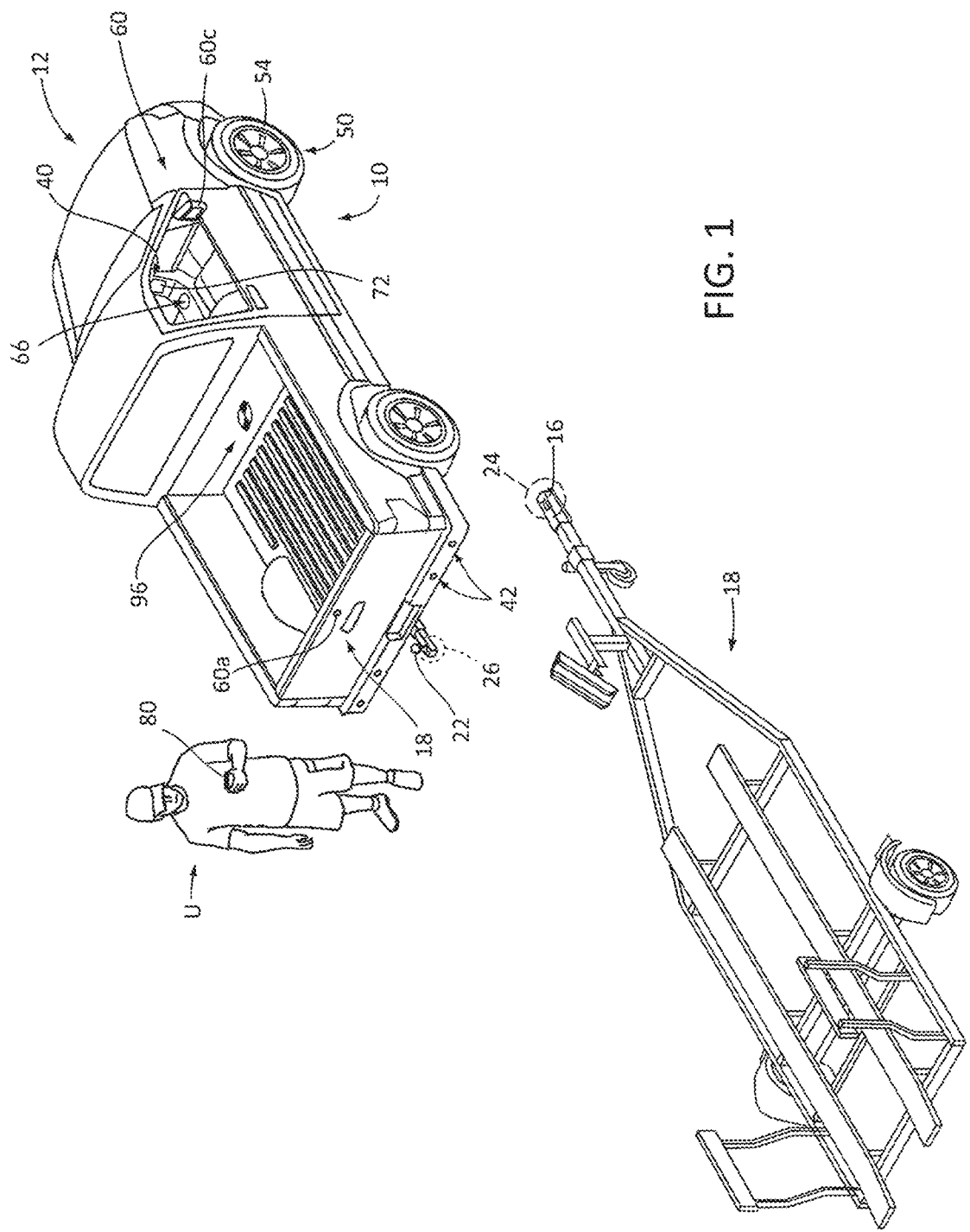
FIG. 1 is a perspective view of a vehicle in an unhitched position relative to a trailer.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary implementations of the inventive concepts defined in the appended claims. Hence, specific dimensions and other physical characteristics relating to the implementations disclosed herein are not to be considered as limiting, unless the claims expressly state otherwise. Additionally, unless otherwise specified, it is to be understood that discussion of a particular feature or component extending in or along a given direction or the life does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various implementations, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in an operating direction or a steering direction of the vehicle 12. In various implementations, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In operation, the system 10 may track a position of the trailer 18 and the coupler position 24 in image data or various sensory data captured by the vehicle 12 while maneuvering the vehicle 12 along the path 20. For successful operation, the tracking of the trailer 18 should be sufficiently accurate to ensure that the coupler position 24 remains within a maneuvering range of the vehicle 12. Such tracking of the trailer 18 and/or the coupler 16 may be accomplished by processing image data captured via an imaging system 60. An example of an imaging system is discussed later in reference to FIGS. 2 and 4.

In some implementations, the system 10 may be configured to process the image data or sensory data captured by the imaging system 60 via a point tracking method. The point tracking method may be configured to track portions of the image data (e.g. edges, objects, homogeneous portions, etc.) as the vehicle 12 is maneuvered by processing a temporal sequence of image data (e.g. image frames) captured by the imaging system 60 throughout maneuvering operations of the vehicle 12. The portions of the image data identified in the scene captured by the imaging system 60 may be configured to process the image data to optimize the detection of the coupler 16 relative to the hitch ball 22. Accordingly, the system 10 may be configured to identify the coupler position 24 of the coupler 16 in the image data to provide a robust approximation of the location in a variety of diverse situations that may create challenges.

Figure 2:
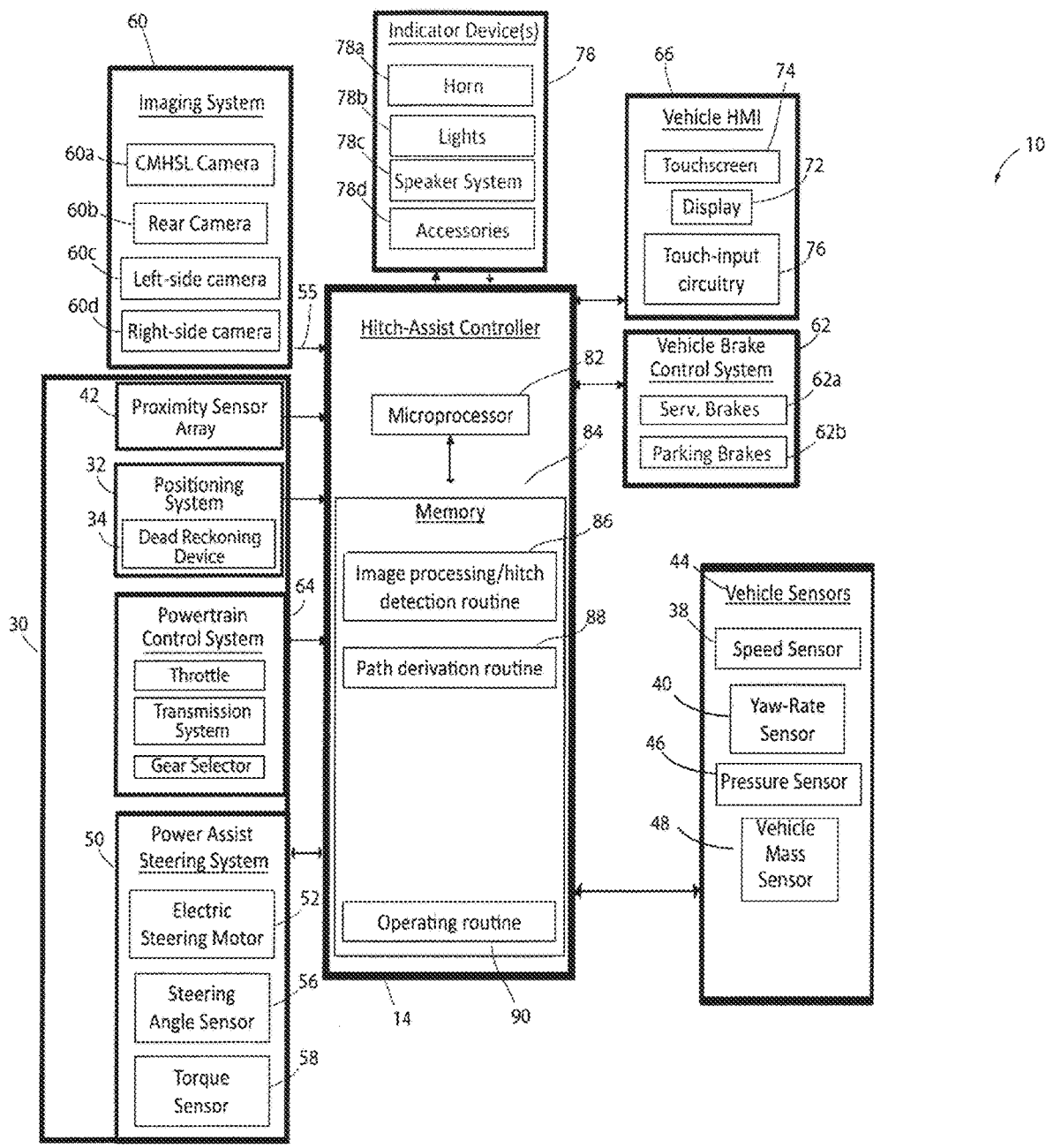
FIG. 2 is a diagram of a system according to an aspect of the disclosure for assisting in aligning the vehicle with a trailer in a position for hitching the trailer to the vehicle.
Figure 3:
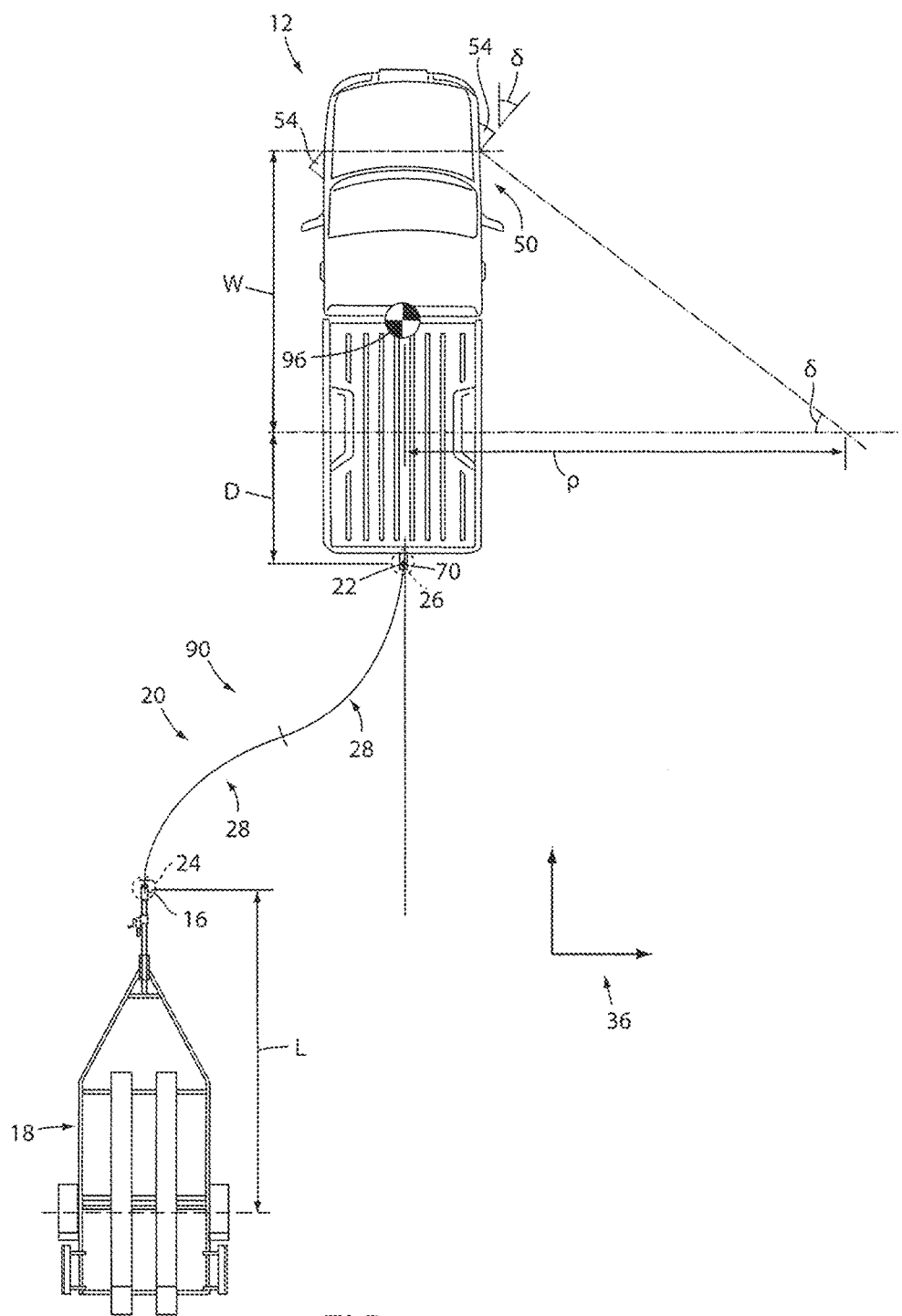
FIG. 3 is a plan view of a vehicle during a step of the alignment sequence with the trailer.
Figure 4:
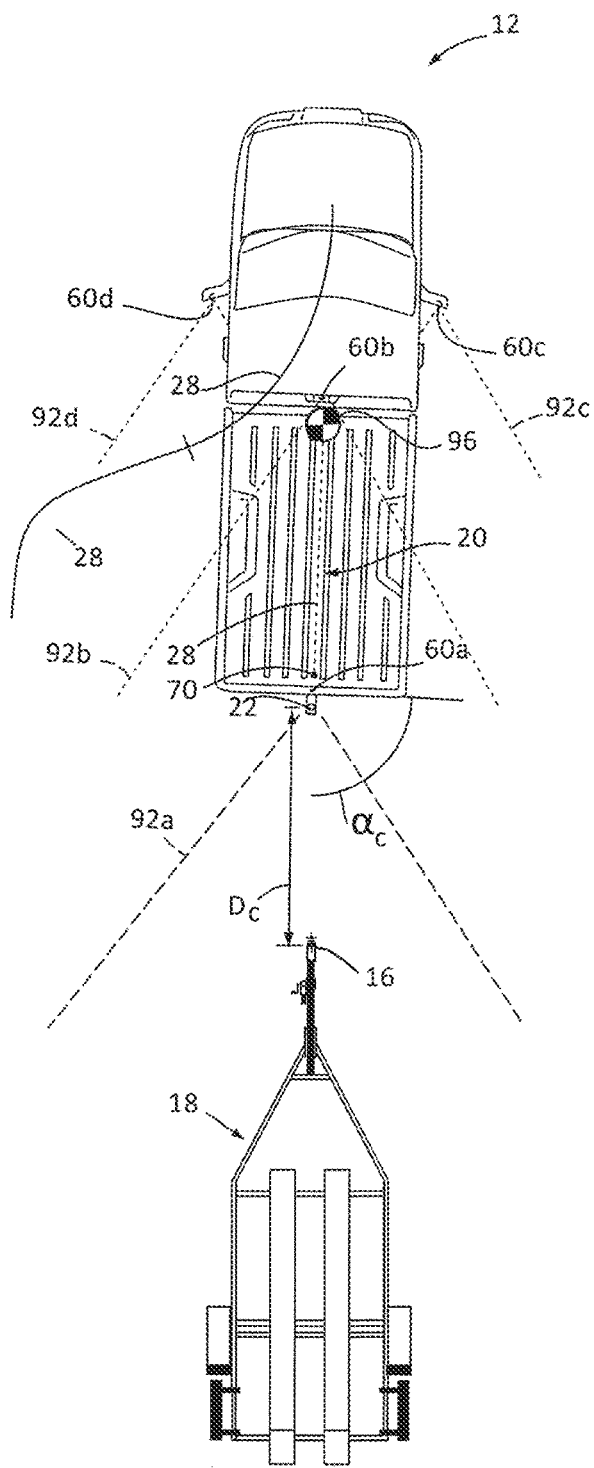
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead-reckoning device 34 or, in addition or as an alternative, a global-positioning system (GPS), to determine a coordinate location of the vehicle 12 based on the one or more locations of the devices within the positioning system 32. In particular, the dead-reckoning device 34 can establish and track the coordinate location of the vehicle 12 within a localized coordinate system 36 based at least on vehicle speed and steering angle δ as shown in FIG. 3. Other vehicle information received by the hitch assist system 10 may include a speed of the vehicle 12 from a speed sensor 38 and a yaw rate of the vehicle 12 from a yaw rate sensor 40. Other additional information received by the hitch assist system 10 may include a pressure sensor 46 to detect the brake pressure of the vehicle 12 or a vehicle mass sensor 48 to detect the mass of the vehicle 12. It is contemplated that in additional implementations, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $\alpha_c$) of the coupler 16.

In some implementations, the system 10 may be configured to identify a stopping threshold based on the position data, which may be derived from one or more sensors in communication with the controller 14. As further discussed in reference to FIGS. 5-6, the stopping threshold may be demonstrated as a boundary region 31. In operation, the controller 14 may be configured to process the positional data or scanning data to define the boundary region 31 extending from various portions of the trailer 18 that may be detected in the scanning data as further discussed herein. The extents or distance that the boundary region 31 is defined relative to the trailer 18 and the coupler 16 may be determined by the controller 14 based on a stopping distance of the vehicle 12. In this configuration, the system 10 may be configured to maneuver the vehicle 12 and control a braking procedure of the vehicle 12 in response to the hitch ball 22 entering the boundary region 31. In this way, the system 10 may be configured to accurately stop the vehicle 12 such that the hitch ball 22 is aligned with the coupler 16.

Referring generally to FIGS. 7-10, the system 10 may be configured in an autonomous or automated driving setting to accurately stop the vehicle 12. Without appropriate control, brake pressure build up can result in a harsh deceleration or acceleration as the vehicle 12 approaches the coupler 16. The brake pressure build up may be controlled via a longitudinal control 150, which may correspond to or be included as a component of a vehicle brake control system 62. The system 10 may also be configured to monitor the speed of the vehicle 12, calculate the braking distance as the vehicle 12 approaches the coupler 16, and detect the change in speed of the vehicle 12. The change in speed may be the result of a powertrain control system 64 of the vehicle adjusting a throttle to compensate for changes in terrain. The system 10 may also frequently update the calculation of the braking distance as the hitch ball 22 of the vehicle 12 approaches the coupler 16 of the trailer 18 based on various braking parameters of the vehicle 12.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 (see FIG. 3) of the vehicle 12, such that the steering wheel moves in concert with steered wheels 54 (see FIG. 3), preventing manual intervention with the steering wheel during autonomous steering. More specifically, a torque sensor 58 is provided on the power assist steering system 50 that senses torque on the steering wheel that is not expected from autonomous control of the steering wheel and, therefore, indicative of manual intervention. In this configuration, the hitch assist system 10 may alert the driver to discontinue manual intervention with the steering wheel and/or discontinue autonomous steering. In alternative implementations, some vehicles have a power assist steering system 50 that allows a steering wheel to be partially decoupled from movement of the steered wheels 54 (see FIG. 3) of such a vehicle.

With continued reference to FIG. 2, the power assist steering system 50 provides the controller 14 of the hitch assist system 10 with information relating to a rotational position of the steered wheels 54 (see FIG. 3) of the vehicle 12, including a steering angle δ. The controller 14 in the illustrated embodiment processes the current steering angle, in addition to other vehicle 12 conditions to guide the vehicle 12 along the desired path 20 (FIG. 3). It is conceivable that the hitch assist system 10, in additional implementations, may be an integrated component of the power assist steering system 50. For example, the power assist steering system 50 may include a hitch assist algorithm for generating vehicle steering information and commands as a function of all or a portion of information received from an imaging system 60, the power assist steering system 50, the vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Determination of the brake pressure command may involve sensitivity to traveling velocity, acceleration, distance to target, current brake pressure, pressure build rate, minimum pressure to maintain standstill, vehicle mass, tire radius, and more. The interdependence of these parameters may be crucial in generating a precise command of brake pressure.

Accordingly, in operation, the controller 14 may be configured to control the brakes 62a and 62b as well as detect vehicle brake pressure information, which may be determined from the pressure sensor 46 and the vehicle mass sensor 48. The controller 14 may also be configured to detect speed information, which may be determined from individual wheel speed sensors monitored by the brake control system 62. Vehicle speed may also be determined from the powertrain control system 64, the speed sensor 38, and/or the positioning system 32, among other conceivable means. In some implementations, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the vehicle 12 to the trailer 18. For example, the hitch assist system 10, in some implementations, may regulate speed of the vehicle 12 during alignment of the vehicle 12 with the coupler 16 of trailer 18, which can reduce the potential for contact between the vehicle 12 and the trailer 18, and can bring vehicle 12 to a complete stop at a determined endpoint 70 (see FIG. 3) of the path 20 (see FIG. 3). It is disclosed herein that the hitch assist system 10 may additionally or alternatively issue an alert signal corresponding to a notification of an actual, impending, and/or anticipated contact between the vehicle 12 and the trailer 18. Thus, regulation of the speed of the vehicle 12 may be advantageous to prevent contact with trailer 18.

This disclosure may provide a way to stop a vehicle by controlling a brake pressure of the vehicle brake control system 62. The vehicle brake control system 62 may be a conventional brake system, which dissipates the vehicle kinetic energy through friction or a regenerative braking system. The vehicle brake control system 62 may also correspond to a regenerative brake system or other types that may convert the vehicle kinetic energy to hydraulic or air potential energy (e.g. an accumulator in hydraulic hybrid vehicles) or chemical energy (e.g. battery in electrified vehicle system). In this disclosure, the brake pressure is the control factor. Some implementations may replace the brake pressure with a brake torque.

In some implementations, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some implementations, the controller 14 may be configured to control a gear of the transmission system and/or prompt the user U to shift to a desired gear to complete semi-automated operations of the vehicle 12.

Continuing in reference to FIG. 2, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some implementations, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some implementations, the indicator devices 78 may further include one or more accessories 78d, which may correspond to communication devices, remote controls, and a variety of devices that may provide for status and operational feedback between the user U and the vehicle 12. For example, in some implementations, the HMI 66, the display 72, and the touchscreen 74 may be controlled by the controller 14 to provide status updates identifying the operation or receiving instructions or feedback to control the hitch assist system 10. Additionally, in some implementations, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described vehicle sensors 44 and vehicle systems, including the indicator devices 78, the vehicle HMI 66, the imaging system 60, a maneuver system 30, the vehicle brake control system 62, and other vehicle sensors and devices. The maneuver system 30 may comprise a proximity sensor 42, positioning system 32, powertrain control system 64, power assist steering system 50, or other vehicle sensors and devices, which may relate to the maneuvering of the vehicle 12. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image-processing routine 86 and/or hitch detection routine, a path derivation routine 88, and an operating routine 90.

In order to avoid any unnecessary harsh braking, the hitch assistance system 10 may comprise the vehicle brake control system 62, a maneuver system 30, and an image system 60 configured to capture a plurality of image data. The maneuver system 30 may include a power control system 64, a power assist steering system 50, and/or a positioning system 32. The system 10 may also comprise a velocity sensor, also called a speed sensor, 38 configured to detect the velocity of the vehicle 12, the pressure sensor 46 configured to detect a pressure of the brake system, and the vehicle mass sensor 48 configured to detect a vehicle mass.

With continued reference to FIG. 2. The controller 14 may be configured to control the maneuver system 30 of the vehicle 12 along a vehicle path 20 within the boundary region 31, and identify a coupler position 24 to derive the distance $D_c$ to coupler 16 based on the image data depicting a coupler 16 of the trailer 18. The controller 14 may also be configured to calculate a stopping distance for the braking operation based on a plurality of braking parameters. The braking parameters may comprise a number of variables that may differ from one vehicle to the next. A number of dynamic braking parameters that may vary throughout the operation of the vehicle 12 may include the velocity, the brake pressure, and the vehicle mass. In operation, the system may monitor the braking parameters to control a stop of the vehicle 12 via the braking operation within the vehicle brake control system 62. In this way, the braking control system 62 may control the vehicle to stop in response to the coupler distance being less than or equal to the stopping distance.

The braking operation may initiate the hitch assistance system 10 configured to control a braking operation between the hitch ball 22 and the coupler 16. The controller 14 may update a stopping distance based on a change in at least one of the braking parameters to ensure that the brake pressure is applied at a linear rate throughout the braking operation. The controller 14 may also calculate the stopping distance by calculating a pressure of the brake control system 62, a pressure build rate of the brake control system 62, and/or a minimum standstill brake pressure of the vehicle 12. Exemplary calculations are discussed in further detail in reference to FIG. 10. The calculations may enable the brake control system 62 to decelerate the vehicle 12 to a standstill by gradually increasing the brake pressure at a linear rate. The purpose of controlling the brake pressure of the vehicle 12 in the described manner may be to create a smooth transition from the time the vehicle 12 is in motion to the time the vehicle 12 is at a standstill while also ensuring that the hitch ball 22 of the vehicle 12 is aligned with the coupler 16 when the velocity reaches zero.

It should be appreciated that the controller 14 may be a stand-alone dedicated controller or may be a shared controller integrated with other control functions, such as integrated with a vehicle sensor system 44, the power assist steering system 50, the braking control system 62, and other conceivable on-board or off-board vehicle control systems. It should further be appreciated that the image-processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes an image-processing functionality, such as that described herein, may be referred to herein as an "image processor" regardless of other functionality it may also implement (including simultaneously with executing image-processing routine 86).

Continuing in reference to FIG. 2, system 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which, in the depicted arrangement, include fields of view 92a, 92b, 92c, and 92d (see FIG. 4) to correspond with rear camera 60a, center high-mount stop light (CHMSL) camera 60b, and side-view cameras 60c and 60d, respectively. In this manner, image data from two or more of the cameras can be combined in image-processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d (see FIG. 4), including any objects (obstacles or coupler 16, for example) therein. In an embodiment, the use of two images including the same object can be used to determine a location of the object relative to the two image sources, given a known spatial relationship between the image sources. In this respect, the image-processing routine 86 can use known programming and/or functionality to identify an object within image data from the various cameras 60a, 60b, 60c, and 60d within imaging system 60. In either example, the image-processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image-processing routine 86 can be specifically programmed or otherwise configured to locate the coupler 16 within image data. In one example, the image-processing routine 86 can identify the coupler 16 within the image data based on stored or otherwise known visual characteristics of coupler 16 or hitches, in general. In another embodiment, a marker in the form of a sticker, or the like, may be affixed with trailer 18 in a specified position relative to the coupler 16 in a manner similar to that which is described in commonly-assigned U.S. Pat. No. 9,102,271, the entire disclosure of which is incorporated by reference herein. In such an embodiment, image-processing routine 86 may be programmed with identifying characteristics of the marker for location in image data, as well as the positioning of coupler 16 relative to such a marker so that the position 24 of the coupler 16 can be determined based on the marker location.

Additionally, or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co-pending, commonly-assigned U.S. Pat. No. 10,266,023, the entire disclosure of which is incorporated by reference herein. The image-processing routine 86 can then correlate the location of the touch input with the coordinate system 36 applied to image data shown on the display 72, which may be depicted as shown in FIG. 3.

As shown in FIG. 3, the image-processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image-processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta} \quad (1)$$

in which the wheelbase W is fixed and the steering angle $\delta$ can be controlled by controller 14 by communication with steering system 50, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead-reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified known area) to determine the needed positioning of vehicle 12 to align hitch ball 22 with coupler 16. In this way, the vehicle 12 may execute the braking operation near the end of the path derivation routine 88.

Referring now to FIGS. 5A and 5B, top plan views of the vehicle 12 are shown demonstrating a guidance routine configured to align the hitch ball 22 with coupler 16. As illustrated, the controller 14 may be configured to maneuver the vehicle 12 in reverse along a heading direction 102, which may be identified based on the path 20 determined via the path derivation routine 88. As previously discussed, the controller 14 may be configured to control the brake control system 62 to control the approach of the vehicle 12 at the endpoint 70 of the path 20. In order to ensure that the vehicle 12 may accurately stop at the endpoint 70, the controller 14 may determine the boundary region 31 based on the stopping distance of the vehicle 12 and further execute the braking operation. In this way, the system 10 may control the vehicle 12 to accurately align the hitch ball 22 with the coupler 16 in a variety of approach angles while preventing a contact between the vehicle 12 and the trailer 18 as well as any unnecessary harsh braking.

In FIG. 5A, the vehicle 12 is shown at a first distance $d_1$, and, in FIG. 5B, the vehicle 12 is shown at a second distance $d_2$ relative to the coupler position 24. As the vehicle 12 approaches the trailer 18, the controller 14 may decrease the vehicle speed to an approach speed. The approach speed of the vehicle 12 may provide for a stopping distance $d_s$ of the vehicle 12 to be consistently controlled by the system 10. For example, the stopping distance $d_s$ of the vehicle 12 may be calculated based on various control parameters of the brake control system 62 and/or calibrated by sample data captured by the system 10 during one or more trial measurements. The calculation of the stopping distance $d_s$ may be calculated as a function of the velocity of the vehicle 12, the performance of the brake system 62, a surface gradient or angle of the surface on which the vehicle 12 is operating and the mass of the vehicle 12. In order to provide for the surface gradient, the controller 14 may be in communication with vehicle sensors 44, such as an inertial measurement unit (IMU), a gyroscope, an inclinometer, and/or an accelerometer. Additionally, the mass of the vehicle 12 may be measured by a vehicle mass sensor 48 and may be in communication with the controller 14. In this way, the system 10 may be configured to calculate and/or determine the stopping distance $d_s$. In some implementations, the stopping distance $d_s$ may be calibrated based on a desired deceleration rate of the vehicle 12. The calibration may be based on the surface gradient, the vehicle mass of the vehicle 12, etc., as previously discussed.

Referring now to FIG. 6, a flowchart demonstrating an alignment routine 120 is shown in accordance with the disclosure. In operation, the controller 14 may begin the routine 120 by detecting the coupler position 24 of the coupler 16 in connection with the trailer 18 (122). Once the coupler position 24 is determined, the controller 14 may continue to identify the path 20 of the vehicle 12 based on the path derivation routine 88 (124). Once the path is identified, the controller 14 may control the system 10 to maneuver the vehicle 12 along the path 20 (126). While maneuvering the vehicle 12, the controller 14 may monitor the distance of the coupler position 24 along the path 20 (128). If the distance is greater than an approach distance (e.g. a predetermined distance), the controller 14 may return to step 124. If the distance is less than the approach distance, the controller 14 may identify the stopping distance $d_s$ of the vehicle 12 based on the approach speed, load, and additional operating parameters as discussed herein (130).

Based on the stopping distance $d_s$, the controller 14 may further define the boundary region 31 (132). Once the boundary region 31 is determined, the controller 14 may continue to maneuver the vehicle 12 along the path 20 at the approach speed (134). Additionally, the controller 14 may continue monitoring the distance to the coupler position 24 along the path 20 to determine if a portion (e.g. the hitch ball 22) of the vehicle 12 has entered or crossed a threshold of the boundary region 31 (136). If the vehicle 12 has entered the hitch boundary region 31, the controller 14 may control the brake control system 62 to stop the vehicle 12 (138). If the vehicle 12 has not entered the hitch boundary region 31, the controller 14 may continue to control the vehicle 12 along the path 20 at the approach speed (134).

After the vehicle 12 has stopped, the controller 14 may determine if the hitch position 26 is aligned with the coupler position 24 (140). The determination of the alignment of the hitch position 26 with the coupler position 24 may be determined based on the image data captured via the imaging system 60. If the hitch position 26 is not aligned with the coupler position 24, the controller 14 may output an indication or notification of an unsuccessful alignment (142). If the hitch position 26 is aligned with the coupler position 24 in step 140, the controller 14 may output an alignment success indication (144). Following either of steps 142 and 144, the controller 14 may complete the alignment routine 120. In this way, based on the determination of the boundary region 31, the controller 14 may accurately stop the vehicle 12 with the hitch ball 22 aligned with the coupler 16.

Figure 7:
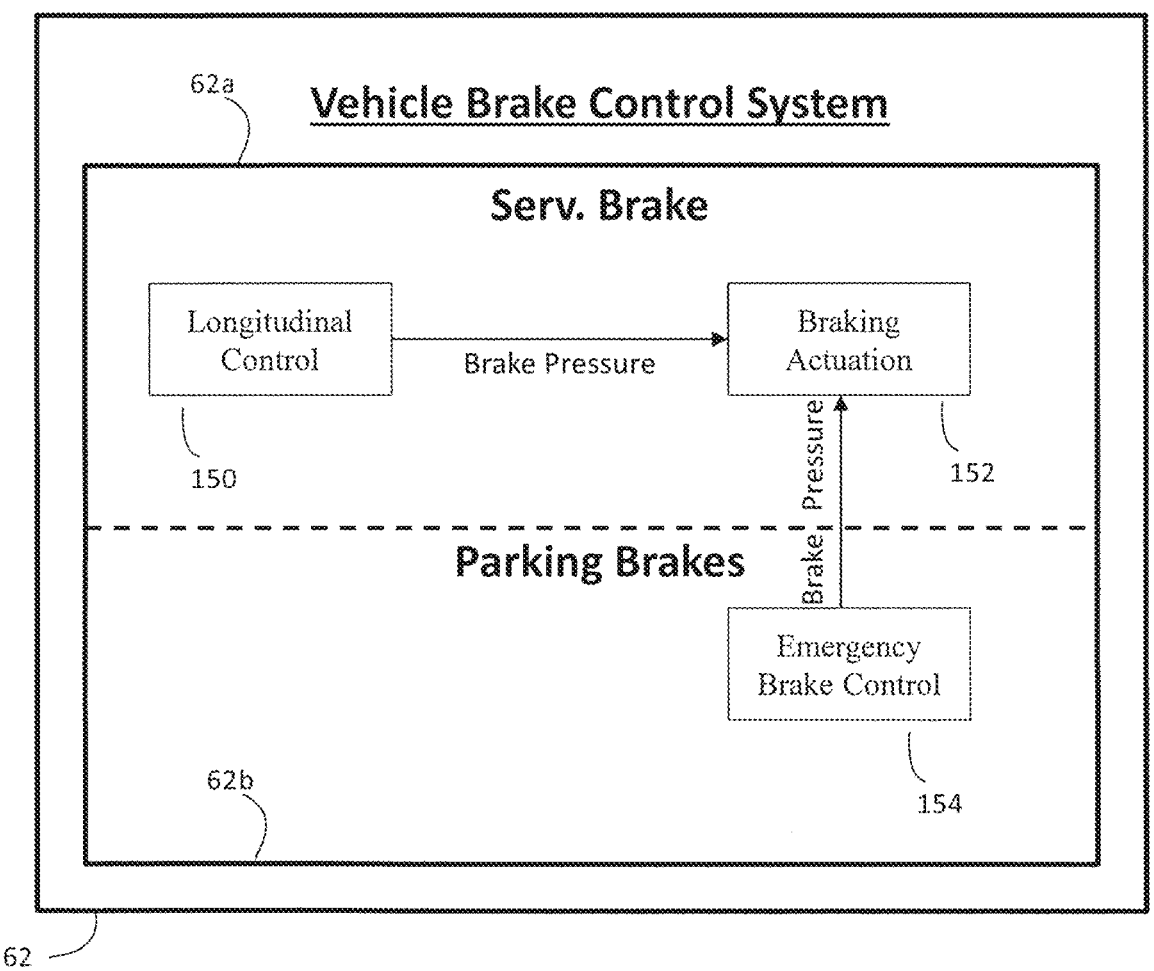
FIG. 7 is a block diagram of a brake system demonstrating a control structure for a longitudinal control.

Referring now to FIG. 7, a diagram of the brake control system 62 is shown. In autonomous or assisted driving, on-board computer systems may assist the driver's role to accelerate, decelerate, steer, and stop the vehicle 12. FIG. 7 shows a detailed diagram of an exemplary implementation of the brake control system 62. As shown, the brake control system 62 may provide for motion control of the vehicle 12 via a longitudinal control 150 configured to control a braking actuation. The vehicle 12 may also have emergency brake control 154, which may be applied to hold the vehicle 12 in place. In an assisted driving situation, a controller 14 may command the brake pressure (or brake torque) within the braking actuation 152 to accurately stop the vehicle 12 with the hitch ball 22 aligned with the coupler 16.

Furthermore, the longitudinal control 150 may provide for the braking actuation 152 to be applied as a smooth deceleration profile regardless of the vehicle's loading conditions and on various road surfaces (e.g., snow, grass, gravel, etc.) and grades. Such operation may require the brake control system 62 to consistently monitor the braking parameters such that the system 62 can detect variations and adjust the control of the service brakes 62a to stop the vehicle 12 via the smooth deceleration profile. In order to avoid variations in a deceleration rate and harsh braking of the vehicle 12, the brake control system 62 may detect variations in the braking parameters such that the brake control system 62 may change a timing and corresponding stopping distance required to stop the vehicle 12. In this way, the braking control system 62 may be configured to accurately stop the vehicle 12 with a consistent deceleration profile or rate and align the hitch ball 22 aligned with the coupler 16 even if one or more of the braking parameters changes during operation.

Maintaining the smooth braking profile while accurately aligning the hitch ball 22 with the coupler 16 may be challenging. For example, if the brake pressure builds up too fast due to a change in operating speed required to stop the vehicle 12, the driver may feel a harsh deceleration and/or the vehicle 12 may be stopped without successfully aligning hitch ball 22 aligned with the coupler 16. Additionally, if the brake pressure builds up too slow, the hitch ball 22 of the vehicle 12 may overshoot the coupler 16 of the trailer 18. Thus, the hitch assistance system 10 may incorporate a control method configured to consistently apply a deceleration profile by controlling a pressure command for the braking control system 62 to be implemented near the end of the maneuver by gradually increasing the brake pressure at a linear rate. In this way, the system 10 may achieve the final alignment requirements of the auto-hitch feature while avoiding unnecessary harsh braking or passenger discomfort.

Figure 8:
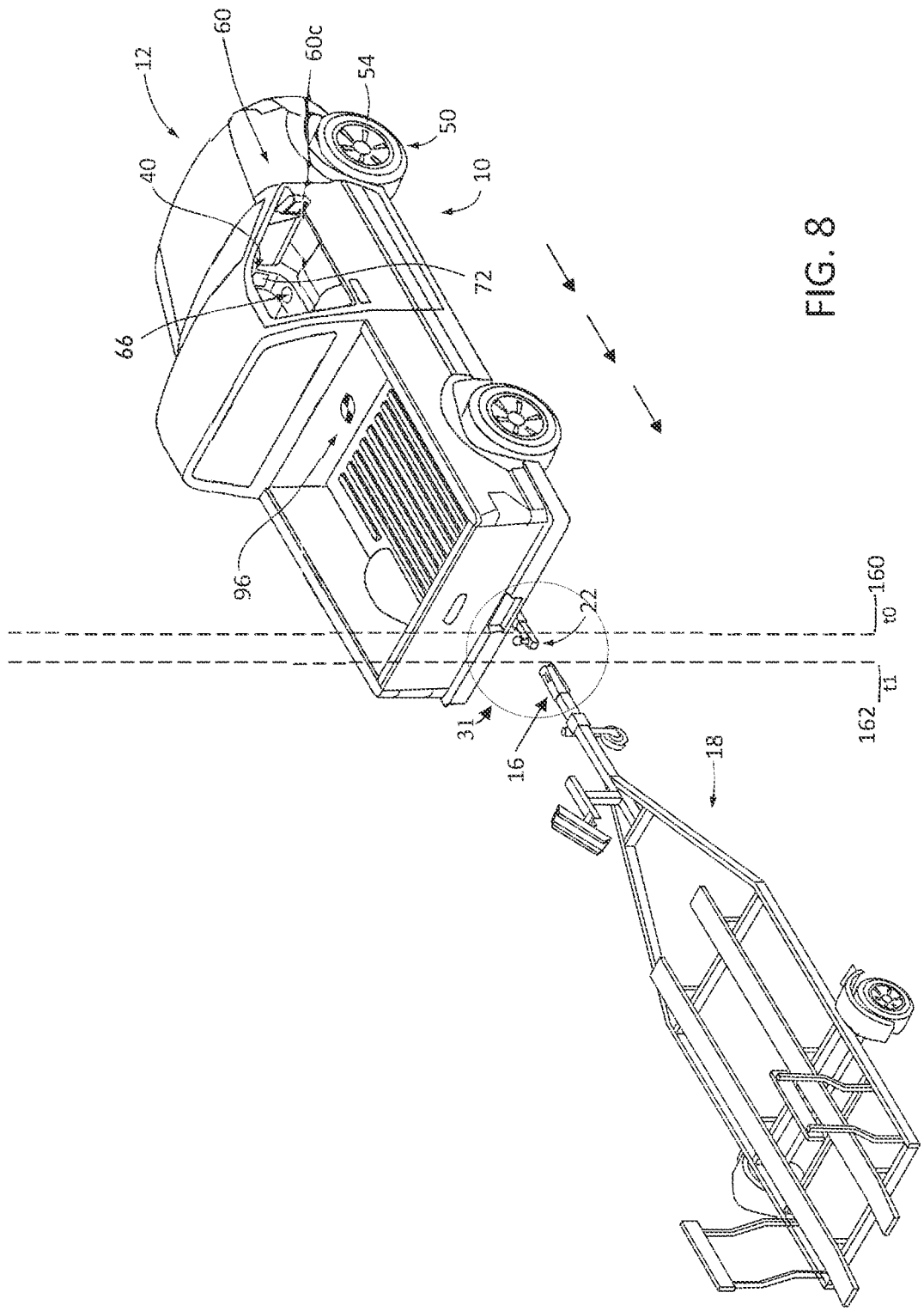
FIG. 8 is a perspective view of a vehicle in a final alignment using a longitudinal control brake precision in reference with a trailer.

Now referring to FIG. 8, the perspective view of a vehicle control system 10 configured to control a braking operation aligning the hitch ball 22 of the vehicle 12 with a coupler 16 on the trailer 18 is shown. During the auto-hitching maneuver, the longitudinal controller 150 (see FIG. 8) may control the vehicle speed and maneuver the hitch ball 22 of the vehicle 12 toward the coupler 16 of the trailer 18. As the vehicle 12 approaches the trailer 18, the velocity of the vehicle 12 may also be gradually reduced from a braking start time $t_0$ 160 to a stop time $t_1$ 162. The method to determine the pressure command may be derived by the difference between the braking start time $t_0$ 160 to the stop time $t_1$ 162 when the vehicle 12 is brought to a standstill. This method may control the vehicle 12 to align the hitch ball 22 with the coupler 16 to meet the alignment requirements of the maneuver (i.e., positioning the hitch ball 22 directly underneath the coupler 16). Thus, the vehicle 12 may avoid unnecessary harsh braking, which may cause driver discomfort.

Figure 9A:
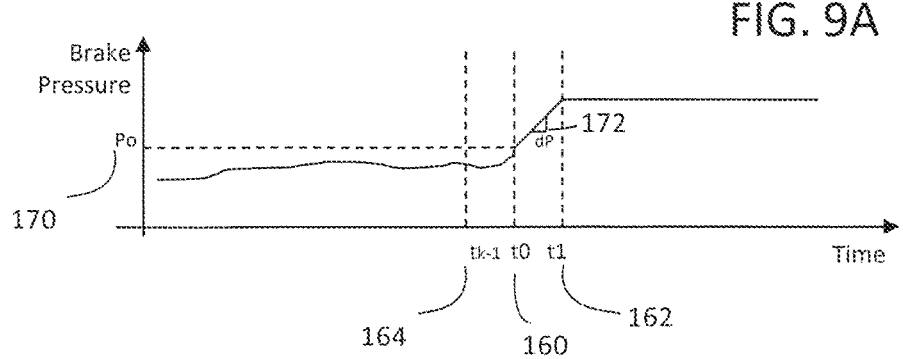
FIG. 9A is a line graph illustrating the brake pressure in relation to time.
Figure 9B:
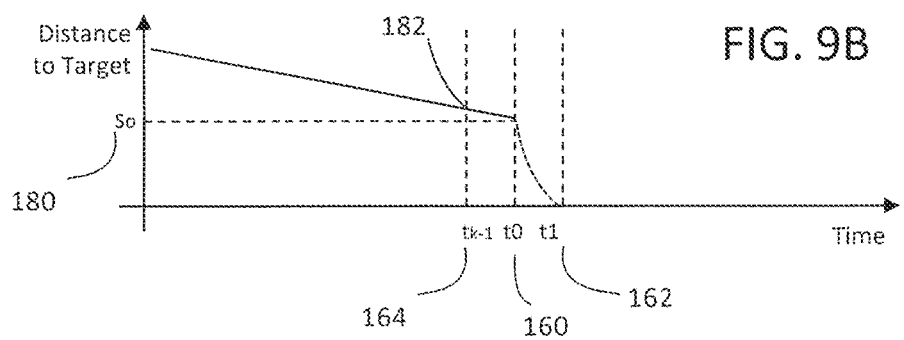
FIG. 9B is a line graph illustrating the distance to target in relation to time.
Figure 9C:
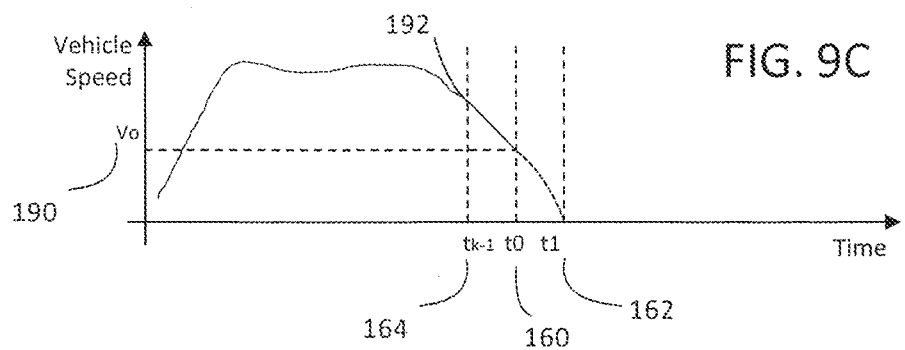
FIG. 9C is a line graph illustrating the vehicle speed in relation to time.

Referring now to FIGS. 9A-9C, the time trace of key signals such as the brake pressure of the service brakes 62a, the distance $D_c$ to coupler 16 or target distance, and the vehicle speed, respectively, are shown. FIG. 9A illustrates how the brake pressure is calculated when the distance $D_c$ of the vehicle 12 to coupler 16 is less than a threshold value (e.g. $S_0$ as shown in FIG. 9B). FIG. 9B illustrates the relationship between the distance to the target (e.g. the distance $D_c$ with respect to time, where the distance $S_0$ is the required braking distance. As shown in FIG. 9A, the braking system 62 may be configured to control the brake pressure as a substantially linear function of time. Accordingly, as the longitudinal control 150 of the brake control system 62 linearly increases the brake pressure from $t_0$ to $t_1$, the distance to the target or distance $D_c$ may reach zero (as shown in FIG. 9B). As shown, a braking start time is denoted as 160 and the standstill or stop time is denoted as 162. Similarly, the speed of the vehicle 12 may also be controlled by the brake control system 62 and may be reduced to zero (as shown in FIG. 9C) simultaneously or congruently with the alignment of the position of the hitch ball 22.

Figure 10:
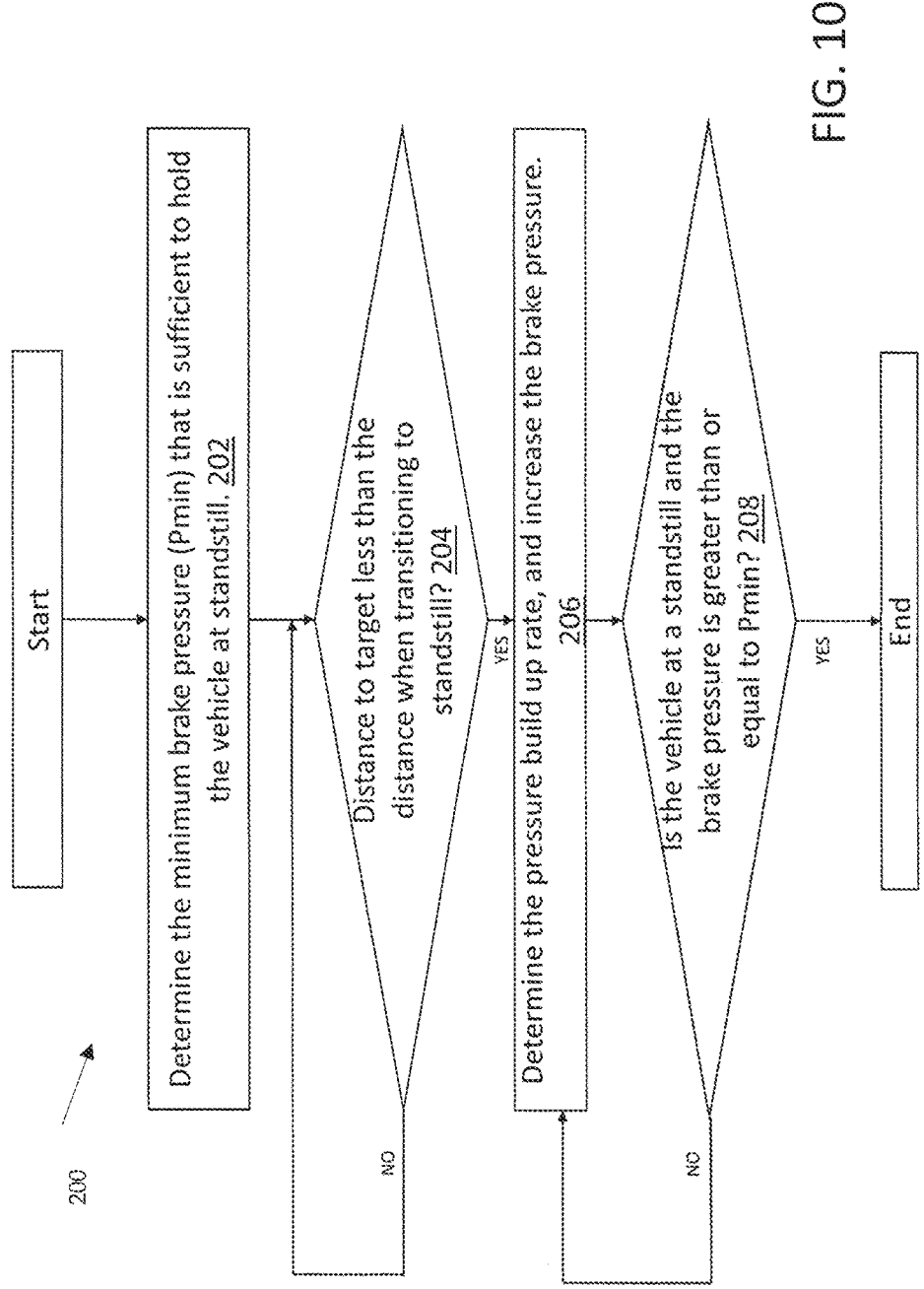
FIG. 10 is a general flowchart of a method for a brake control technique to stop a vehicle during assisted automatic trailer hitching in accordance with the disclosure.

Referring now to FIG. 10, a general flowchart of a method for the hitch assistance system 10 to stop the vehicle 12 during assisted or automatic hitching operation is shown. The pressure sensors 46 may determine the minimum brake pressure ($P_{min}$) that may be sufficient to hold the vehicle at a standstill (202). For example, the minimum brake pressure ($P_{min}$) may be calculated as the longitudinal control 150 linearly increases the brake pressure $P_0$ at the braking start time 160. At low speed, the deceleration of the vehicle 12 may be proportional to the applied braking pressure. Therefore, the deceleration of the vehicle 12 may be a linear function of time as well, according to the following equation:

$$a(t) = -K \cdot t, 0 \leq t \leq t_1 - t_0 \tag{3}$$

where a is the acceleration of the vehicle 12 (a<0 during brake), and K is jerk, which defines the absolute rate of change of acceleration. It follows that integrating the acceleration produces the velocity function v(t) where $V_0$ is the vehicle speed when the transition to a standstill starts 190, according to the following equation:

$$v(t) = \int_0^{t_1-t_0} a(t)dt = V_0 - \tfrac{1}{2}Kt^2 \qquad (4)$$

Further, integrating the velocity may provide a distance to target function s(t), where $S_0$ is the distance to target when transitioning to a standstill starts 180, according to the following equation:

$$s(t) = \int_0^{t_1-t_0} v(t)dt = S_0 - V_0 t + \tfrac{1}{6}Kt^3 \qquad (5)$$

Note that during the maneuver, the vehicle 12 may travel backwards towards the trailer 18. As shown in FIG. 9C, the velocity of the vehicle 12 may be defined as positive when the vehicle 12 is in reverse.

Continuing to reference FIG. 10, the vehicle 12 may be brought to a standstill by the brake control system 62 at $t_1$ ($v(t_1)=0$), as the hitch ball 22 of the vehicle 12 aligns with the coupler 16 of the trailer 18, or the distance to target may be reduced to zero ($s(t_1)=0$) simultaneously or congruently, accordingly to the following equations:

$$v(t_1) = 0 = V_0 - \tfrac{1}{2}K(t_1-t_0)^2 \qquad (7)$$

$$s(t_1) = 0 = S_0 - V_0(t_1-t_0) + \tfrac{1}{6}K(t_1-t_0)^3 \qquad (7)$$

By rearranging the above equations and solving for $t_1-t_0$, the difference between the time $t_0$ and the time $t_1$ may yield the transition duration T of the transition. As previously introduced, the start time $t_0$ is when the vehicle braking operation begins and the stop time $t_0$ is when transition to a standstill is complete. Also, by rearranging the above equations, the jerk K, which defines the absolute rate of change of acceleration, may be derived, accordingly to the following equations:

$$T = t_1 - t_0 = \frac{3 \cdot S_0}{2 \cdot V_0} \qquad (8)$$

$$K = \frac{2V_0}{(t_1-t_0)^2} = \frac{2V_0}{T^2} = \frac{8 \cdot V_0^3}{9 \cdot S_0^2} \qquad (9)$$

Thus, the acceleration of the vehicle 12 may be derived since the transition duration T and jerk K only depend on $S_0$ and $V_0$. Therefore, by using the linear function of acceleration as described above, the equation for K can be inserted and result in the desired linear acceleration:

$$a(t) = -\frac{8 \cdot V_0^3}{9 \cdot S_0^2} \cdot t, \; 0 \leq t \leq T \qquad (10)$$

Once the desired linear acceleration is determined, the desired brake pressure build rate may be defined accordingly to the equation:

$$dP = \left( M_v \cdot \frac{8 \cdot V_0^3}{9 \cdot S_0^2} \cdot R_r + dT_d \right) \cdot C_{t2p} \qquad (11)$$

where $dT_d$ is the derivative of the drive torque at t=0, which may be used to compensate possible drive torque variation during $0 \leq t \leq T$. $M_v$ is the vehicle's 12 mass, and $R_r$ is the tire rolling radius. $C_{t2p}$ is a constant for converting brake torque to pressure. The controller 14 may manipulate the above pressure control strategy and implement the strategy as follows:

$$P_k = P_{k-1} + dP \cdot \Delta T \qquad (12)$$

where $P_k$ is the pressure command at time step k, $P_{k-1}$ is pressure of the previous step, and $\Delta T$ is the sampling period. Next, the brake control system 62 may determine the minimum brake pressure to keep the vehicle 12 at a standstill position. The minimum brake pressure may be determined by calculating a minimum pressure $P_{min}$ that may be required to hold the vehicle 12 at standstill. The minimum pressure $P_{min}$ may vary based on a road grade or surface quality as denoted in equation 13:

$$P_{min} = (T_{dt} + M_v \cdot g \cdot \sin \vartheta \cdot R_r) \cdot C_{t2p} \qquad (13)$$

In equation 13, g is the gravitational acceleration and $\vartheta$ is the road grade.

During typical operation, the brake control system 62 may control the brake pressure to ramp up until the vehicle 12 comes to a standstill at $t_1$ with $P_k \geq P_{min}$. Additionally, the brake control system 62 may be configured to gradually and smoothly stop the vehicle 12 even in circumstances where the velocity of the vehicle 12 increases unexpectedly (e.g., after vehicle overcomes an obstacle). In order to account and correct for the unexpected increase in velocity, the controller 14 may calculate the jerk K and rate of change of the brake pressure dP throughout the path derivation routine 88. Accordingly, by monitoring the braking parameters, the longitudinal controller 150 of the brake control system 62 may update the calculation of the brake pressure to ensure the hitch ball 22 of the vehicle 12 does not overshoot the intended position or alignment with the coupler 16 of the trailer 18.

For example, points 182 and 192 in FIGS. 9B and 9C respectively, show a point when the hitch ball 22 of the vehicle 12 is approaching the coupler 16 of the trailer 18. At such points, the longitudinal control 150 of the braking system 62 may calculate the jerk and rate of change of the brake pressure based on equations 14 and 15. If the calculated $dP(t_{k-1})$ is greater than a threshold that exceeds the brake hardware capability, a brake pressure defined in 16 will be applied before $S_0$ is reached. In this way, the longitudinal controller 150 may control the motion of the vehicle 12 to avoid unnecessary harsh braking or the hitch ball 22 misaligning with the coupler 16.

$$K(t_{k-1}) = \frac{8 \cdot v(t_{k-1})^3}{9 \cdot s(t_{k-1})^2} \qquad (14)$$

$$dP(t_{k-1}) = (M_v \cdot K(t_{k-1}) \cdot R_r + dT_d(t_{k-1})) \cdot C_{t2p} \qquad (15)$$

$$P_k = P_{k-1} + dP(t_{k-1}) \cdot \Delta T \qquad (16)$$

In continuing reference to FIG. 10, the controller 14 may repeat step 204 until the distance $D_c$ to coupler 16 or target distance is less than the distance to target when transitioning to standstill starts. After the controller 14 identifies that the distance to target may be less than the distance when transitioning to a standstill began, the controller 14 may determine the pressure build rate dP, and increase the brake pressure accordingly (206). Next, the controller 14 may control the brake control system 62 to increase the brake pressure until the vehicle 12 may be at a standstill and the brake pressure may be greater than or equal to the minimum brake pressure $P_{min}$ that was identified in step 202 (208). The controller 14 may then end the routine. However, if the brake pressure may be less than $P_{min}$, the controller may return to step (206).

The specific detailed steps discussed in reference to the various implementations and methods described herein are examples provided to demonstrate some useful applications of the systems and devices disclosed by the application. It shall be understood that the disclosed systems, devices, and each of the corresponding related elements implemented to complete the various methods discussed herein are provided as exemplary illustrations of the disclosure. Accordingly, the detailed implementations shall not be considered limiting to the scope of the disclosure.

It will be understood by one having ordinary skill in the art that construction of the described concepts, and other components, may be not limited to any specific material. Other exemplary implementations of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary implementations, is illustrative only. Although only a few implementations of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary implementations without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle control system configured to control a braking operation of a hitch ball to a coupler on a trailer comprising:
    a brake control system comprising a pressure sensor that detects a brake pressure of the brake control system;
    a maneuvering system;
    an image sensor configured to capture an image data; and
    a controller receives a velocity of a vehicle, the brake pressure of the brake control system, and a vehicle mass, wherein the controller further:
       controls the maneuvering system of the vehicle along a vehicle path;
       identifies a coupler distance based on the image data depicting a coupler of the trailer;
       calculates a stopping distance for the braking operation based on a plurality of braking parameters, wherein the braking parameters comprise the velocity, the brake pressure, and the vehicle mass;
       calculates a brake pressure build rate that increases the brake pressure such that the stopping distance is less than or equal to the coupler distance;
       controls the vehicle brake control system via the braking operation with the brake pressure build rate as calculated; and
       stops the vehicle via the braking operation within the vehicle brake control system.

2. The vehicle control system according to claim 1, wherein the controller further, in response to the coupler distance less than or equal to the stopping distance, controls the vehicle brake control system to execute the braking operation.

3. The vehicle control system according to claim 1, wherein the braking operation comprises controlling the brake pressure build rate as a linear increase in the brake pressure.

4. The vehicle control system according to claim 3, wherein the braking operation comprises updating a stopping distance based on a change in at least one of the braking parameters while maintaining the brake pressure and increasing the brake pressure build rate as the linear increase throughout the braking operation.

5. The vehicle control system according to claim 1, wherein calculating the stopping distance further comprises calculating a brake pressure of the braking system or a minimum standstill brake pressure of the braking system of the vehicle.

6. The vehicle control system according to claim 1, wherein the controller effectuates a smooth deceleration profile by gradually increasing the brake pressure at a linear rate.

7. A method for controlling a braking operation of a vehicle comprising:
    controlling a maneuver of the vehicle along a vehicle path;
    monitoring a coupler distance from a hitch ball to a coupler;

calculating a stopping distance to stop the vehicle with a brake pressure build rate of a brake pressure increasing at a linear rate based on the coupler distance from the hitch ball to the coupler;

detecting a velocity change;

detecting the brake pressure build rate of the brake pressure;

updating the brake pressure build rate such that the brake pressure is sufficient to stop the vehicle in the stopping distance; and stopping the vehicle with a smooth deceleration profile via the braking operation, wherein the smooth deceleration profile comprises monitoring and updating the calculation of the stopping distance in response to detecting the velocity change to maintain the linear rate.

8. The method according to claim 7, in response to the coupler distance less than or equal to the stopping distance, executing the braking operation.

9. The method according to claim 7, wherein calculating the stopping distance is further based on calculating at least one of the brake pressure of the braking operation or a minimum standstill brake pressure of the braking system of the vehicle.

10. The method according to claim 7, wherein the calculation of the stopping distance is based on a mass of the vehicle and a tire radius of the vehicle.

11. The method according to claim 7, wherein the velocity change results from change in at least one of a road grade and a drive torque.

12. The method according to claim 7, wherein the maneuver of the vehicle comprises controlling a powertrain control system and a power assist steering system.

13. A method for controlling a braking operation of a vehicle comprising:

controlling a maneuver of the vehicle along a vehicle path;

monitoring a plurality of braking parameters for changes during the maneuver, wherein the plurality of braking parameters comprise a velocity, a brake pressure, a grade of the vehicle path, and a vehicle mass;

calculating a stopping distance for the braking operation based on the plurality of braking parameters to maintain a build rate of the brake pressure at a linear rate based on a coupler distance from a hitch ball to a coupler;

calculating a minimum standstill brake pressure based on the grade or a surface quality of the vehicle path;

updating the calculation of the stopping distance in response to detecting a change in at least one of the braking parameters including the grade; and stopping the vehicle via the braking operation.

14. The method according to claim 13, wherein the maneuver of the vehicle comprises monitoring a powertrain control system, a power assist steering system, and a positioning system.

15. The method according to claim 13, wherein the braking operation maintains a brake pressure of the braking operation such that the brake pressure is greater than or equal to the minimum standstill brake pressure in response to the vehicle at a standstill.

16. The method according to claim 15, wherein the braking operation comprises applying the build rate of the brake pressure as a linear increase in a brake pressure.

17. The method according to claim 13, wherein calculating the stopping distance further comprises calculating at least one of a brake pressure build rate of the braking operation.

18. The method according to claim 17, wherein calculating the stopping distance further comprises accessing a mass of the vehicle and a tire radius of the vehicle to calculate the minimum standstill brake pressure.

19. The method according to claim 13, wherein the change in the braking parameters comprises a drive torque change.

20. The vehicle control system according to claim 13, wherein a controller effectuates a smooth deceleration profile by gradually increasing the brake pressure at a linear rate.

* * * * *